United States Patent
Watanabe (10) Patent No.: US 10,511,770 B2
(45) Date of Patent: Dec. 17, 2019

(54) ACCESSORY APPARATUS AND RECORDING MEDIUM STORING CONTROL PROGRAM FOR ACCESSORY APPARATUS

(71) Applicant: CANON KABUSHIKI KAISHA, Tokyo (JP)

(72) Inventor: Yutaka Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/427,592

(22) Filed: Feb. 8, 2017

(65) Prior Publication Data

US 2017/0237902 A1    Aug. 17, 2017

(30) Foreign Application Priority Data

Feb. 12, 2016 (JP) .................................. 2016-024956

(51) Int. Cl.
| | |
|---|---|
| H04N 5/232 | (2006.01) |
| H04N 5/225 | (2006.01) |
| G03B 17/56 | (2006.01) |
| G03B 17/14 | (2006.01) |

(52) U.S. Cl.
CPC ......... H04N 5/23241 (2013.01); G03B 17/14 (2013.01); G03B 17/56 (2013.01); H04N 5/2254 (2013.01); H04N 5/23209 (2013.01); G03B 2205/0053 (2013.01); G03B 2206/00 (2013.01); G03B 2217/007 (2013.01)

(58) Field of Classification Search
CPC ........... H04N 5/23241; H04N 5/23203; H04N 5/23245; H04N 5/2254; H04N 5/3698; H04N 5/23209; H04N 5/23212; H04N 5/23296; G03B 2217/007; G03B 2206/00; G03B 13/36; G03B 13/34; G03B 13/10; G03B 3/10; G03B 5/00; G03B 17/14; G03B 17/56; G03B 2205/0053
USPC ............................................ 348/333.13, 372
See application file for complete search history.

(56) References Cited

U.S. PATENT DOCUMENTS

| | | | | |
|---|---|---|---|---|
| 2007/0126883 A1* | 6/2007 | Ishige | ................ | H04N 5/23209 348/211.14 |
| 2008/0180565 A1* | 7/2008 | Sakai | ...................... | G03B 7/26 348/372 |
| 2011/0229114 A1* | 9/2011 | Okada | .................... | G03B 17/14 396/71 |
| 2011/0229115 A1* | 9/2011 | Okada | .................... | G03B 17/14 396/71 |
| 2012/0033955 A1* | 2/2012 | Okada | ...................... | G02B 7/14 396/71 |
| 2013/0077952 A1* | 3/2013 | Sugiyama | .............. | G03B 17/56 396/530 |

FOREIGN PATENT DOCUMENTS

| | | |
|---|---|---|
| JP | 2014-235449 A | 12/2014 |
| JP | 2015-94863 A | 5/2015 |

* cited by examiner

*Primary Examiner* — Albert H Cutler
(74) *Attorney, Agent, or Firm* — Canon U.S.A., Inc. IP Division (57) ABSTRACT

An accessory apparatus attached to an interchangeable lens attached to a camera body can switch between a first accessory power mode and a second accessory power mode consuming less power than the first accessory power mode. The power state of the accessory apparatus is set based on information regarding the power mode of the camera body and the power mode of the interchangeable lens.

15 Claims, 7 Drawing Sheets

ACCESSORY APPARATUS AND RECORDING MEDIUM STORING CONTROL PROGRAM FOR ACCESSORY APPARATUS

BACKGROUND

Field

The present disclosure relates to an accessory apparatus attachable to an interchangeable lens attached to an imaging apparatus.

Description of the Related Art

In a camera system including a camera body and an interchangeable lens detachably attached to the camera body, a drive unit is known as an accessory apparatus for driving a magnification-varying lens included in the interchangeable lens. Such an accessory apparatus is detachably attached to the interchangeable lens. Japanese Patent Application Laid-Open No. 2015-94863 discusses a camera system in which an interchangeable lens and a drive unit communicate with each other to transmit and receive position information of members to be driven by the drive unit.

A type of camera system is known that switches between an active mode and a power-saving mode. The power-saving mode consumes less power than the active mode. Japanese Patent Application Laid-Open No. 2014-235449 discusses a camera system including a camera body and an accessory apparatus attached to the camera body. The accessory apparatus sets a power mode according to a command to shift to a power-saving mode received from the camera body.

In general, the power mode of an accessory apparatus such as a drive unit is set according to the power mode of a camera body and an interchangeable lens to which the accessory apparatus is attached. In the camera system discussed in Japanese Patent Application Laid-Open No. 2014-235449, when the camera body enters the power-saving mode, the camera body transmits a command to enter the power-saving mode to the accessory apparatus.

The interchangeable lens attached to the camera body and the accessory apparatus attached to the interchangeable lens can be configured such that, following the shifting of the interchangeable lens to the power-saving mode, the accessory apparatus also enters the power-saving mode. An interchangeable lens generally enters the power-saving mode based on a power-saving command from a camera body, and the camera body can frequently transmit the power-saving command to the interchangeable lens depending on the settings of the camera body. In this case, if the accessory apparatus is shifted to the power-saving mode following the shifting of the interchangeable lens to the power-saving mode as described above, the accessory apparatus will frequently enter the power-saving mode.

When the accessory apparatus is in the power-saving mode, it is difficult to activate the accessory apparatus immediately after a user performs an operation on the accessory apparatus. Therefore, convenience as an imaging system will be lost if the accessory apparatus frequently enters the power-saving mode. In contrast, if the accessory apparatus constantly remains in the active mode and does not enter the power-saving mode, a large amount of power will be consumed by the accessory apparatus.

SUMMARY OF THE INVENTION

Aspects of embodiments are directed to both improving user's convenience and power-saving in an accessory apparatus attachable to an interchangeable lens.

According to an aspect of an embodiment, an accessory apparatus is attached to an interchangeable lens attached to a camera body, the accessory apparatus includes a power mode settable to a first accessory power mode and a second accessory power mode consuming less power than the first accessory power mode the camera body includes a power mode settable to a first camera power mode and a second camera power mode consuming less power than the first camera power mode, and the interchangeable lens includes a power mode settable to a first lens power mode and a second lens power mode consuming less power than the first lens power mode. The accessory apparatus includes an accessory communication unit configured to communicate with the interchangeable lens, and an accessory control unit configured to control the power mode of the accessory apparatus. When information indicating that the power mode of the camera body shifts to the second camera power mode and that the power mode of the interchangeable lens shifts to the second lens power mode is received from the interchangeable lens, the accessory control unit sets the power mode of the accessory apparatus to the second accessory power mode.

Further features will become apparent from the following description of exemplary embodiments with reference to the attached drawings.

DESCRIPTION OF THE EMBODIMENTS

Figure 1:
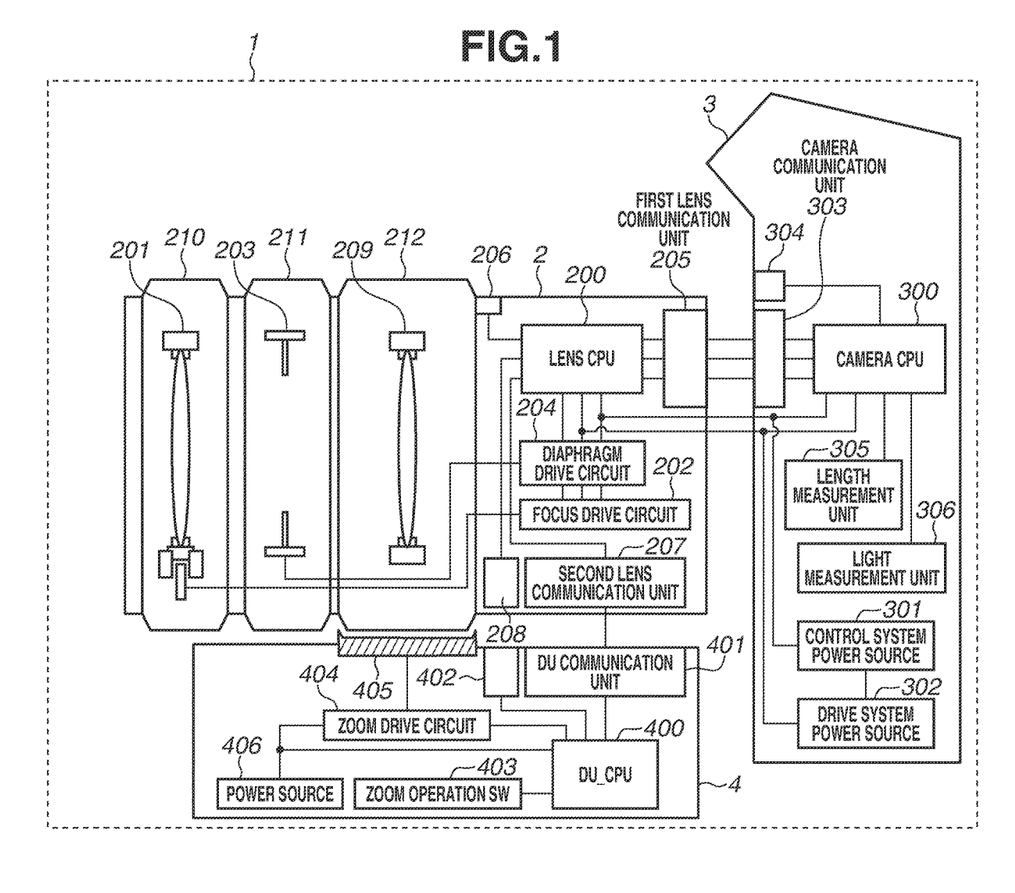
FIG. 1 is a block diagram illustrating a configuration of a camera system including a camera body, an interchangeable lens, and an accessory apparatus according to an exemplary embodiment.

An accessory apparatus and a power control method in the accessory apparatus according to an embodiment will be described in detail below with reference to the accompanying drawings. FIG. 1 illustrates a configuration of a camera system that includes a camera body 3, an interchangeable lens 2 attached to the camera body 3, and a drive unit 4 as an accessory apparatus attachable to the interchangeable lens 2. The camera body 3 communicates with the interchangeable lens 2, and the accessory apparatus communicates with the interchangeable lens 2.

Although, according to the present exemplary embodiment, the drive unit 4 is used as an accessory apparatus, the present exemplary embodiment is not limited thereto, and applicable to accessories other than the drive unit 4. In particular, the present exemplary embodiment is applied to an accessory including a power source used for accessory operations.

The camera body 3 includes a camera central processing unit (CPU) 300, a control system power source 301, a drive system power source 302, a camera communication unit 303, a lens attachment detection unit 304, and a length measurement unit 305. The camera CPU 300 controls the entire camera body 3 and includes memories and control circuits. The control system power source 301 supplies power to control system circuits, such as the length measurement unit 305 and the light measurement unit 306, which consume comparatively low power and require stable output voltages. The drive system power source 302 supplies power to drive system circuits that consume comparatively high power, such as the interchangeable lens 2 and a shutter control unit (not illustrated).

The camera communication unit 303 includes communication terminals (camera communication terminals) for communicating with a first lens communication unit 205 (described below) to transmit and receive length measurement information, light measurement information, and identifier (ID) information to/from the first lens communication unit 205. The lens attachment detection unit 304 detects that the interchangeable lens 2 is attached to the camera body 3. The length measurement unit 305 calculates the amount of defocusing by using a light flux from an imaging optical system included in the interchangeable lens 2. The light measurement unit 306 measures the luminance of a subject.

The interchangeable lens 2 includes a lens a CPU 200, a focus unit 201, a focus drive circuit 202, a diaphragm unit 203, a diaphragm drive circuit 204, the first lens communication unit 205, a zoom position detection unit 206, and a second lens communication unit 207. The interchangeable lens 2 also includes a drive unit attachment detection unit 208, a zoom unit 209, a focus operation unit 210, a diaphragm operation unit 211, and a zoom operation unit 212.

The lens CPU 200 controls the entire interchangeable lens 2, and includes memories and control circuits. The focus drive circuit 202 drives a focus lens according to a command from the lens CPU 200 to perform focusing. The focus operation unit 210 is configured to be manually operated by a user. By operating the focus operation unit 210, the user can drive the focus lens included in the focus unit 201 to manually perform focusing.

The diaphragm drive circuit 204 drives the diaphragm unit 203 according to a command from the lens CPU 200 to change the F value. The diaphragm operation unit 211 is configured to be manually operated by the user. By operating the diaphragm operation unit 211, the user can drive the diaphragm unit 203 to manually adjust the light amount.

The first lens communication unit 205 includes a communication terminal (first lens communication terminal) for communicating with the camera communication unit 303 to transmit and receive length measurement information, light measurement information, and identifier (ID) information to/from the camera communication unit 303. The zoom position detection unit 206 detects the position of the magnification-varying lens for changing the focus length. The second lens communication unit 207 includes a communication terminal (second lens communication terminal) for communicating with a drive unit CPU 400 to transmit and receive various information to/from the drive unit CPU 400.

The drive unit attachment detection unit 208 detects that the drive unit 4 is attached to the interchangeable lens 2. The zoom operation unit 212 is configured to be manually operated by the user. By operating the zoom operation unit 212, the user can drive the magnification-varying lens included in the zoom unit 209 to manually perform zoom operations. In a state where the drive unit 4 is attached to the interchangeable lens 2, the zoom operation unit 212 is operated by a zoom drive unit 405 included in the drive unit 4. The interchangeable lens 2 is supplied with power from the camera body 3 to drive and control the focus unit 201 and the diaphragm unit 203.

The drive unit 4 includes the drive unit CPU 400, a drive unit communication unit 401, an interchangeable lens attachment detection unit 402, a zoom operation switch 403, a zoom drive circuit 404, the zoom drive unit 405, and a power source 406.

The drive unit CPU 400, as an accessory control unit, controls the entire drive unit 4 and includes memories and control circuits. The drive unit communication unit 401, as an accessory communication unit, includes a communication terminal (accessory communication terminal) for communicating with the second lens communication unit 207 to transmit and receive various information to/from the second lens communication unit 207. The interchangeable lens attachment detection unit 402 detects that the interchangeable lens 2 is attached. The zoom operation switch 403 is configured to be operated by the user, and information indicating that the zoom operation switch 403 is operated is transmitted to the drive unit CPU 400. When the zoom operation switch 403 is operated, the drive unit CPU 400 supplies power from the power source 406 to the zoom drive circuit 404 to drive the zoom drive unit 405.

The zoom drive unit 405 is configured to engage with the zoom operation unit 212 included in the interchangeable lens 2 via a gear (not illustrated). When the zoom drive unit 405 drives the zoom operation unit 212, the zoom operation unit 212 rotates to drive the magnification-varying lens. The power source 406, as a power supply unit, supplies power to actuators and control system circuits included in the drive unit 4.

Figure 2:
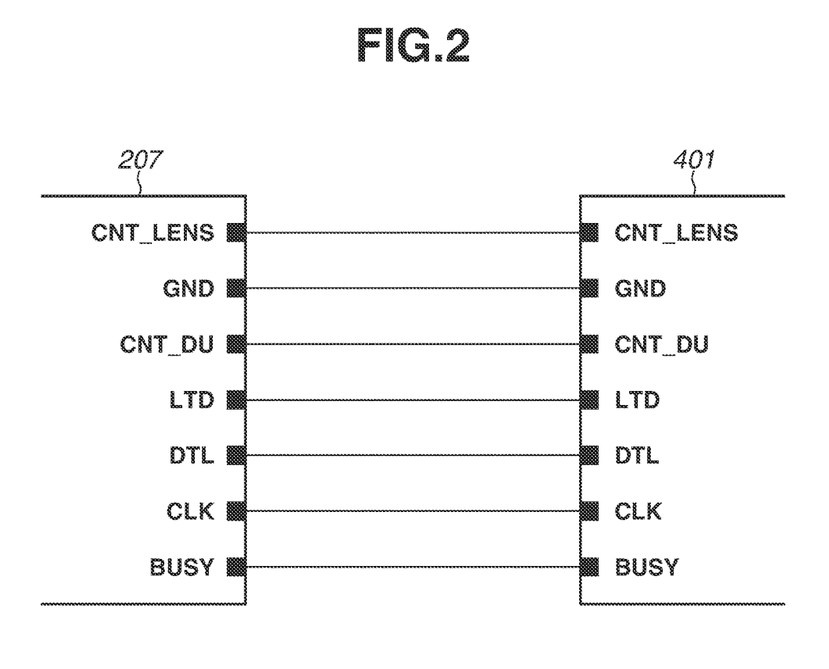
FIG. 2 is a schematic view illustrating connection terminals between the interchangeable lens and the accessory apparatus.

FIG. 2 illustrates connection terminals included in the interchangeable lens 2 and the drive unit 4. The second lens communication unit 207 included in the interchangeable lens 2 and the drive unit communication unit 401 communicate with each other via the connection terminals illustrated in FIG. 2. Although, according to the present exemplary embodiment, seven sets of connection terminals are used, the number of connection terminals is not limited thereto.

CNT_LENS is a terminal for detecting the connection of the drive unit 4. For example, when the interchangeable lens 2 detects the attachment of the drive unit 4, the interchangeable lens 2 sets the voltage level of this terminal to Lo. CNT_DU is a terminal for detecting the connection of the interchangeable lens 2. For example, when the drive unit 4 detects the attachment of the interchangeable lens 2, the drive unit 4 sets the voltage level of this terminal to Lo.

According to the present exemplary embodiment, communication between the second lens communication unit 207 and the drive unit communication unit 401 is performed in clock synchronization type bidirectional serial communication. LTD is a connection terminal for transmitting data from the interchangeable lens 2 to the drive unit 4. DTL is a connection terminal for transmitting data from the drive unit 4 to the interchangeable lens 2. CLK is a connection terminal for transmitting and receiving a clock signal for controlling the communication timing between the drive unit 4 and the interchangeable lens 2. The clock signal is transmitted from the interchangeable lens 2 to the drive unit 4. BUSY is a connection terminal for limiting data communication from the interchangeable lens 2 to the drive unit 4. After receiving data from the interchangeable lens 2, the drive unit 4 sets the voltage level of the BUSY terminal to Lo. Thus, the drive unit 4 notifies the interchangeable lens 2 that the drive unit 4 cannot receive data from the interchangeable lens 2. Based on the voltage level of the BUSY terminal, the interchangeable lens 2 can recognize whether communication with the drive unit 4 is possible. GND is a grounding terminal.

Figure 3:
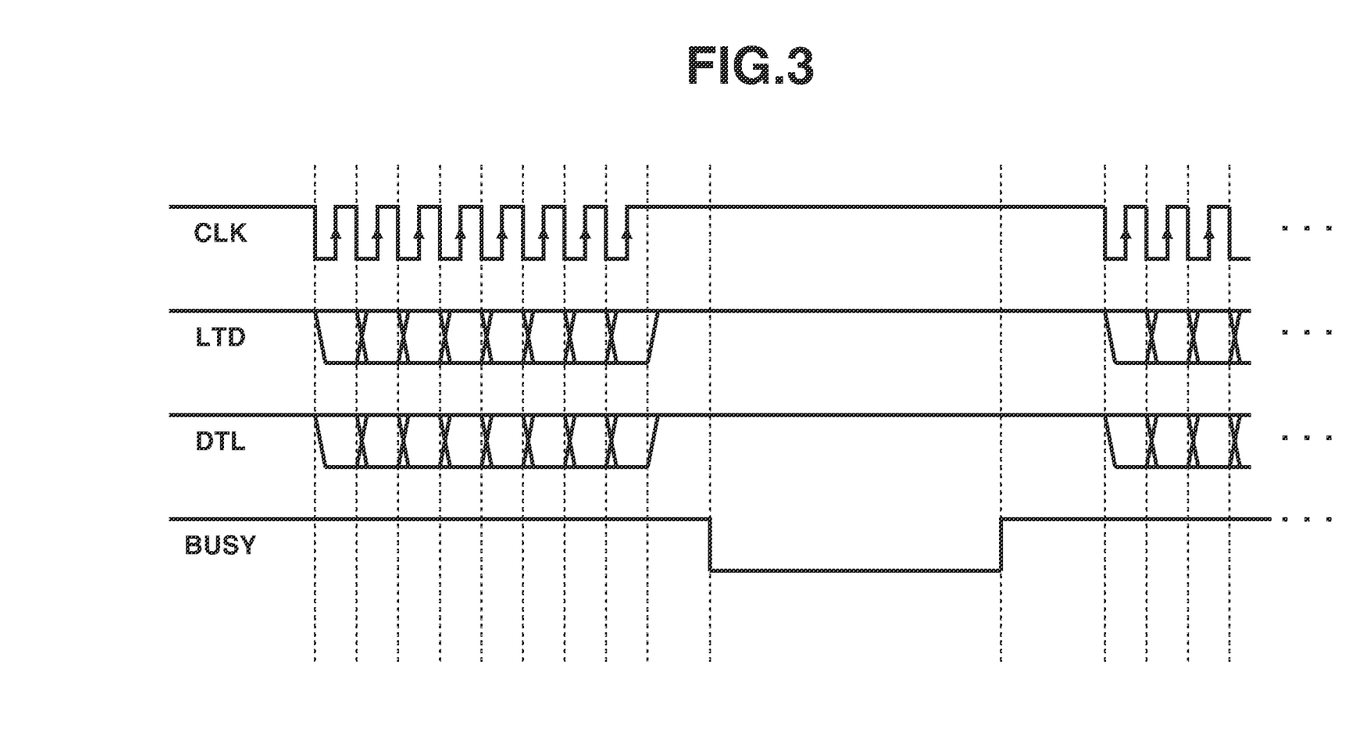
FIG. 3 is a schematic view illustrating communication waveforms between the interchangeable lens and the accessory apparatus.

FIG. 3 illustrates communication waveforms between the interchangeable lens 2 and the drive unit 4. As described above with reference to FIG. 2, communication between the interchangeable lens 2 and the drive unit 4 is performed by using the CLK, LTD, DTL, and BUSY connection terminals. FIG. 3 illustrates communication waveforms when 8-bit length data is transmitted and received. In synchronization with fall time of a clock signal, the second lens communication unit 207 and the drive unit communication unit 401 output 1-bit data. Then, in synchronization with rise time of a clock signal, the second lens communication unit 207 and the drive unit communication unit 401 capture the data.

Upon completion of transmission and reception of 8-bit length data, the drive unit 4 sets the voltage level of the BUSY terminal to Lo to inhibit data transmission from the interchangeable lens 2 to the drive unit 4. After data receiving processing is completed and communication with the interchangeable lens 2 becomes possible, the drive unit 4 sets the voltage level of the BUSY terminal to Hi to permit data transmission from the interchangeable lens 2 to the drive unit 4. After the voltage level of the BUSY terminal is set to Hi, the interchangeable lens 2 carries out the next communication as required.

Although data communication based on clock synchronization bidirectional serial communication has been described above with reference to FIG. 3, communication between the interchangeable lens 2 and the drive unit 4 can be performed based on other communication methods, such as an asynchronous communication.

Figure 4:
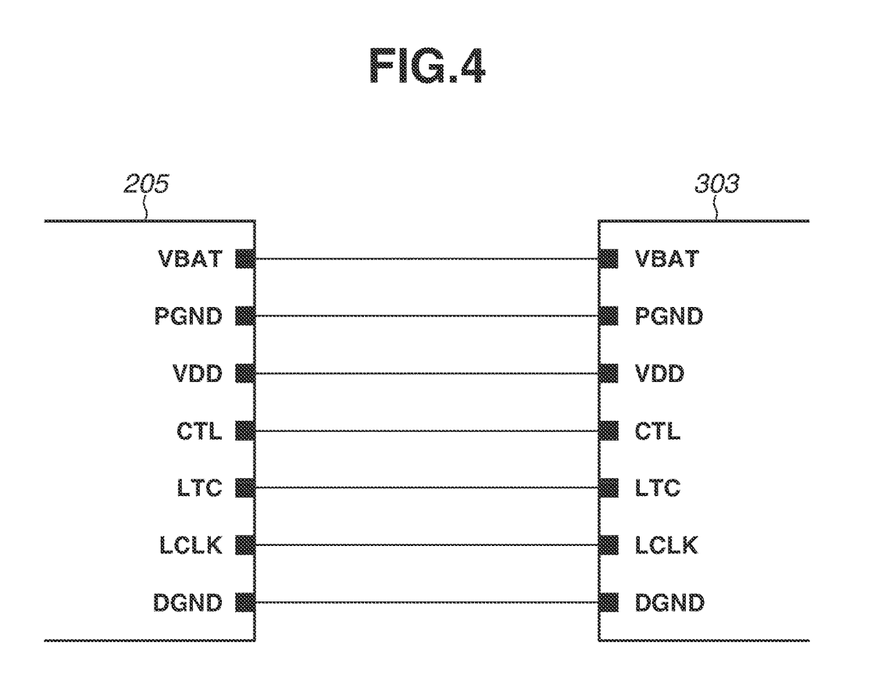
FIG. 4 is a schematic view illustrating connection terminals between the interchangeable lens and the camera body.

FIG. 4 illustrates connection terminals included in the interchangeable lens 2 and the camera body 3. The first lens communication unit 205 included in the interchangeable lens 2 and the camera communication unit 303 perform communication via the connection terminals illustrated in FIG. 4. Although, according to the present exemplary embodiment, seven sets of connection terminals are used, the number of connection terminals is not limited thereto.

VBAT is a terminal for supplying power of the drive system power source 302 from the camera body 3 to the interchangeable lens 2. The interchangeable lens 2 drives and controls various actuators by using power supplied via VBAT. VDD is a terminal for supplying power of the control system power source 301 from the camera body 3 to the interchangeable lens 2. The interchangeable lens 2 controls the lens CPU 200 by using power supplied via VDD.

In the present exemplary embodiment, communication between the first lens communication unit 205 and the camera communication unit 303 is performed based on clock synchronization bidirectional serial communication. LTC is a connection terminal for transmitting data from the interchangeable lens 2 to the camera body 3. CTL is a connection terminal for transmitting data from the camera body 3 to the interchangeable lens 2. LCLK is a connection terminal for transmitting and receiving a clock signal for controlling the communication timing between the camera body 3 and the interchangeable lens 2. The clock signal is transmitted from the camera body 3 to the interchangeable lens 2. PGND is a grounding terminal for the drive system power source 302. DGND is a grounding terminal for the control system power source 301.

Figure 5:
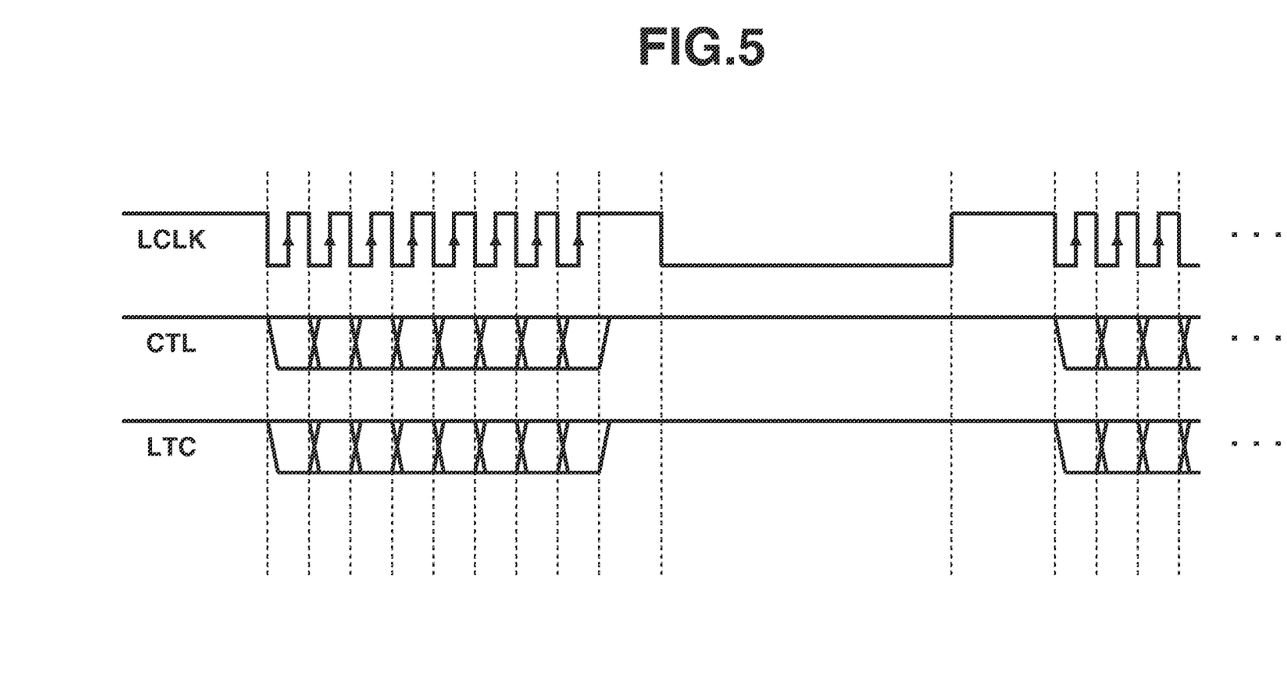
FIG. 5 is a schematic view illustrating communication waveforms between the interchangeable lens and the camera body.

FIG. 5 illustrates communication waveforms between the interchangeable lens 2 and the camera body 3. As described above with reference to FIG. 4, communication between the interchangeable lens 2 and the camera body 3 is performed by using the LCLK, CTL, and LTC connection terminals. FIG. 5 illustrates communication waveforms when 8-bit length data is transmitted and received. The specific communication method is similar to that described with reference to FIG. 3, and redundant description thereof will be omitted. Although data communication based on clock synchronization bidirectional serial communication has been described with reference to FIG. 5, communication between the interchangeable lens 2 and the camera body 3 can be performed with other communication methods such as an asynchronous communication.

A flow of power state processing by the interchangeable lens 2 will be described below with reference to FIG. 6. Power states that the camera body 3, the interchangeable lens 2, and the drive unit 4 can assume will be described below.

Power modes settable in the camera body 3 include the active mode (first camera power mode) and the power-saving mode (second camera power mode), which consumes less power than the active mode. The power mode is changed by the camera CPU 300. In the active mode, various functions of the camera CPU 300 are turned ON, and required information is suitably transmitted and received between the camera body 3 and the interchangeable lens 2, as described above with reference to FIGS. 4 and 5. In the active mode, at least communication related to position information of the magnification-varying lens occurs between the camera body 3 and the interchangeable lens 2.

In the power-saving mode, at least part of the functions of the camera CPU 300 are turned OFF to consume less power than in the active mode. For example, the power-saving mode can include a mode in which at least communication related to the position information of the magnification-varying lens cannot be performed between the camera body 3 and the interchangeable lens 2.

Similar to the camera body 3, power modes settable in the interchangeable lens 2 include the active mode (first lens power mode) and the power-saving mode (second lens power mode), which consumes less power than the active mode. The power mode is changed by the lens CPU 200. In the active mode, various functions of the lens CPU 200 are turned ON, and, as described above with reference to FIGS. 2 to 5, required information is suitably transmitted and received between the camera body 3 and the interchangeable lens 2 and between the drive unit 4 and the interchangeable lens 2. In the active mode, at least communication related to the position information of the magnification-varying lens occurs between the camera body 3 and the interchangeable lens 2 and between the drive unit 4 and the interchangeable lens 2.

In the power-saving mode, at least part of the functions of lens CPU 200 are turned OFF to consume less power than the active mode. For example, the power-saving mode can include a mode in which at least communication related to the position information of the magnification-varying lens cannot be performed between the camera body 3 and the drive unit 4.

The mode transition between the active and power-saving modes in the interchangeable lens 2 is performed according to a command from the camera body 3. Before the camera body 3 enters the power-saving mode, the camera body 3 instructs the interchangeable lens 2 to enter the power-saving mode, and the interchangeable lens 2 enters the power-saving mode.

To shift the interchangeable lens 2 from the power-saving mode to the active mode, the camera body 3 starts transmission of a clock signal to the interchangeable lens 2 and the like. By making a presetting such that the interchangeable lens 2 will enter the active mode when a specific operation is performed on the interchangeable lens 2 by the camera body 3, the camera body 3 can suitably control the power state of the interchangeable lens 2.

Power modes settable in the drive unit 4 include the active mode (first accessory power mode) and the power-saving mode (second accessory power mode), which provides less power consumption than the active mode. The power mode is changed by the drive unit CPU 400. In the active mode, various functions of the drive unit CPU 400 are turned ON, and, as described above with reference to FIGS. 2 and 3, required information is suitably transmitted and received between the drive unit 4 and the interchangeable lens 2. In the active mode, at least communication related to the position information of the magnification-varying lens occurs between the drive unit 4 and the interchangeable lens 2.

In the power-saving mode, at least part of the functions of drive unit CPU 400 are turned OFF to consume less power than the active mode. For example, the power-saving mode can include a mode in which at least communication related to the position information of the magnification-varying lens cannot be performed between the drive unit 4 and the interchangeable lens 2. When the position information of the magnification-varying lens cannot be transmitted or received, the position information of the magnification-varying lens cannot be shared between the interchangeable lens 2 and the drive unit 4, and therefore the zoom drive unit 405 cannot be activated. More specifically, in the power-saving mode, the zoom drive unit 405 may not be immediately activated when the user operates the zoom operation switch 403.

When, for example, the drive unit 4 is set to the power-saving mode while the camera body 3 is in the active mode and the interchangeable lens 2 is in the power-saving mode, the zoom drive unit 405 cannot be immediately activated when the user operates the drive unit 4. While the camera body 3 is in the active mode and the interchangeable lens 2 is in the power-saving mode, maintaining the drive unit 4 in the active mode enables an operation in response to a user operation on the drive unit 4. More specifically, the drive unit 4 can issue a command to the camera body 3, via the interchangeable lens 2, to return the interchangeable lens 2 to the active mode. Thus, in response to an operation performed on the drive unit 4, the interchangeable lens 2 can be shifted to the active mode, enabling the drive unit 4 to perform zoom operations. In the power-saving mode, at least part of the functions of the drive unit 4 is turned OFF, and therefore quick response to an operation on the drive unit 4 can be lost.

Figure 6:
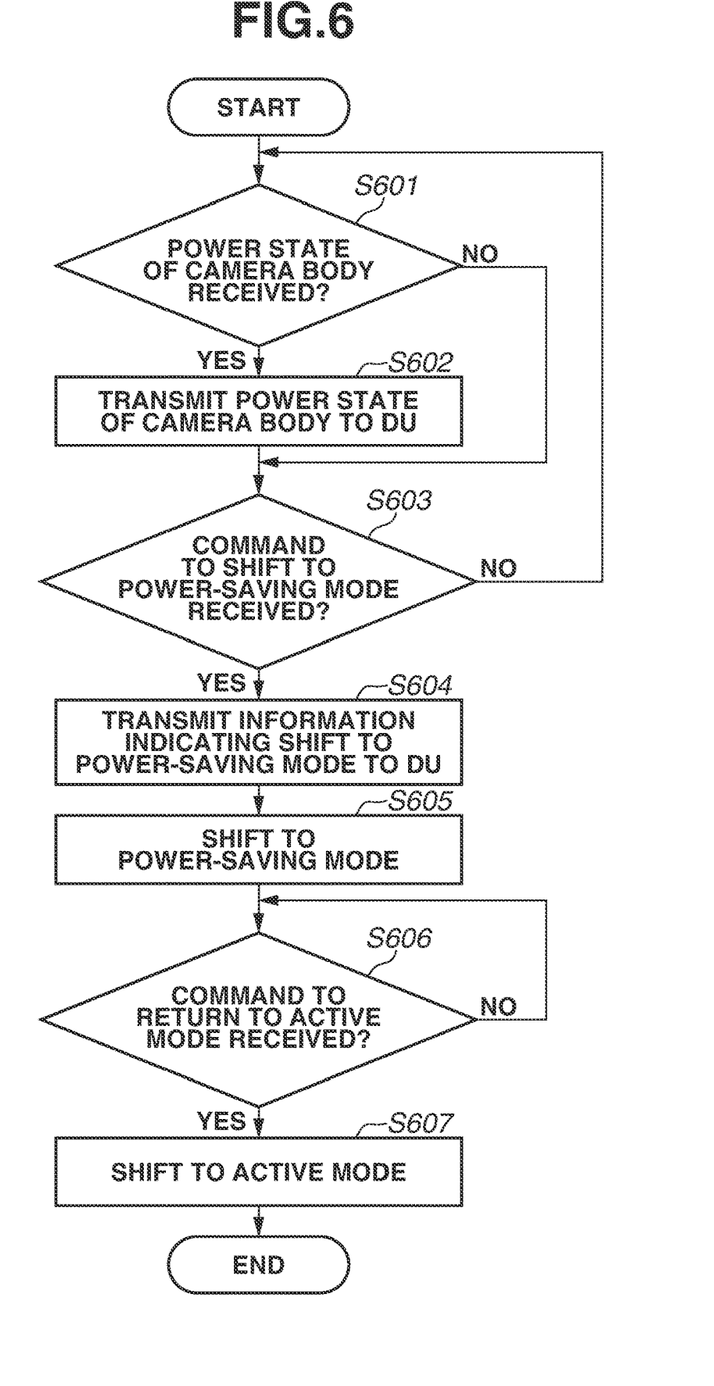
FIG. 6 is a flowchart illustrating power control processing in the interchangeable lens.

The lens CPU 200, as a computer, executes power control processing of the interchangeable lens 2 illustrated in FIG. 6 according to a computer program. In step S601, the lens CPU 200 determines whether information indicating the power state of the camera body 3 is received from the camera body 3. This information includes information whether the power mode of the camera body 3 is the active mode or will shift to the power-saving mode. When the information indicating the power state of the camera body 3 is received (YES in step S601), the processing proceeds to step S602. In step S602, the interchangeable lens 2 transmits information indicating the power state of the camera body 3 to the drive unit 4.

When the lens CPU 200 determines that the information indicating the power state of the camera body 3 is not received (NO in step S601) or when the information indicating the power state of the camera body 3 is transmitted from the interchangeable lens 2 to the drive unit 4 in step S602, the processing proceeds to step S603. In step S603, the lens CPU 200 determines whether a command to shift the power state of the interchangeable lens 2 to the power-saving mode is received from the camera body 3. When the command is received (YES in step S603), the processing proceeds to step S604. When the command is not received (NO in step S603), the processing returns to step S601. In step S604, the lens CPU 200 transmits, to the drive unit 4, information indicating that the interchangeable lens 2 will shift to the power-saving mode. Then, in step S605, the lens CPU 200 shifts the power mode of the interchangeable lens 2 to the power-saving mode.

The control flow illustrated in FIG. 6 indicates that, in the initial state, both the camera body 3 and the interchangeable lens 2 are in the active mode. When the camera body 3 enters the power-saving mode, the camera body 3 transmits, to the interchangeable lens 2, information indicating that the camera body 3 will shift to the power-saving mode. The camera body 3 also transmits to the interchangeable lens 2 a command to shift the power state of the interchangeable lens 2 to the power-saving mode, and the interchangeable lens 2 enters the power-saving mode. Although, in the flowchart illustrated in FIG. 6, the information illustrated in step S601 is transmitted and then the command illustrated in step S603 is transmitted, the information and the command can be simultaneously transmitted from the camera body 3 to the interchangeable lens 2.

If, in the initial state, the camera body 3 is in the active mode and the interchangeable lens 2 is in the power-saving mode, when the camera body 3 enters the power-saving mode, the camera body 3 shifts the interchangeable lens 2 to the active mode. More specifically, before step S601, the camera body 3 transmits to the interchangeable lens 2 a command to shift the power state of the interchangeable lens 2 to the active mode. As described above, since the interchangeable lens 2 is supplied with power from the camera body 3, when the camera body 3 enters the power-saving mode, it does not happen that only the interchangeable lens 2 remains in the active mode.

When the camera body 3 remains in the active mode and shifts the interchangeable lens 2 to the power-saving mode, the camera body 3 transmits to the interchangeable lens 2 information indicating that the camera body 3 is in the active mode and a command to shift the interchangeable lens 2 to the power-saving mode. However, the camera body 3 can transmit to the interchangeable lens 2 just the command to shift the interchangeable lens 2 to the power-saving mode without transmitting the information indicating that the camera body 3 is in the active mode.

In step S606, the lens CPU 200 determines whether the command to return to the active mode is received from the camera body 3. When the return command is received (YES in step S606), the processing proceeds to step S607. In step S607, the power mode of the interchangeable lens 2 shifts to the active mode. When the return command is not received (NO in step S606), the lens CPU 200 repeats the determination in step S606. The return command can be directly transmitted from the camera body 3 to the interchangeable lens 2. When the drive unit 4 issues, to the camera body 3 via the interchangeable lens 2, the command to return the interchangeable lens 2 to the active mode, the camera body 3 issues the return command to the interchangeable lens 2.

More specifically, the drive unit 4 switches the voltage level of a specific connection terminal between the interchangeable lens 2 and the drive unit 4, between Hi and Lo. In response to this switching, the interchangeable lens 2 switches the voltage level of a specific connection terminal between the interchangeable lens 2 and the camera body 3 between Hi and Lo. In response to change of the voltage level of the connection terminal, the camera body 3 issues, to the interchangeable lens 2, the command to return to the active mode.

With the above-described configuration, when the camera body 3 and the drive unit 4 are in the active mode and the interchangeable lens 2 is in the power-saving mode, the interchangeable lens 2 can be returned to the active mode by using a simple method.

Figure 7:
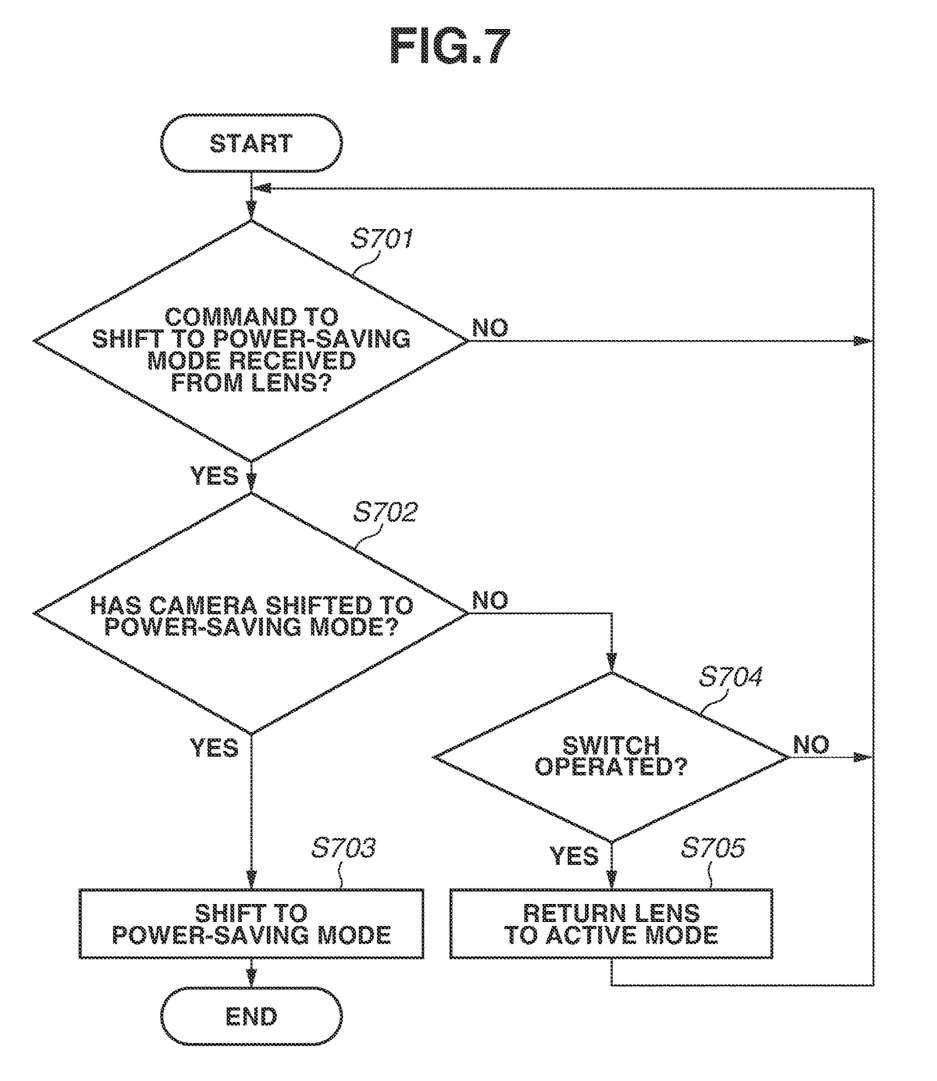
FIG. 7 is a flowchart illustrating power control processing in the accessory apparatus.

A flow of power control processing in the drive unit 4 will be described below with reference to FIG. 7. The drive unit CPU 400, as a computer, performs power control of the drive unit 4 according to a computer program. In step S701, the drive unit CPU 400 determines whether the information indicating that the interchangeable lens 2 will shift to the power-saving mode is received from the interchangeable lens 2. When the information is received (YES in step S701), the processing proceeds to step S702. In step S702, the drive unit CPU 400 determines whether the information indicating that the camera body 3 will shift to the power-saving mode is received from the interchangeable lens 2. When the information indicating that the camera body 3 will shift to the power-saving mode is received (YES in step S702), the processing proceeds to step S703. In step S703, the drive unit CPU 400 shifts the power mode of the drive unit 4 to the power-saving mode.

When the information indicating that the camera body 3 will shift to the power-saving mode is not received (NO in step S702), the drive unit CPU 400 does not shift the power mode of the drive unit 4 to the power-saving mode, and the processing proceeds to step S704. In this case, the camera body 3 and the drive unit 4 are in the active mode, and only the interchangeable lens 2 is set to the power-saving mode.

In step S704, the drive unit CPU 400 determines, for example, whether a zoom operation switch 403 has been operated by the user. When, for example, the zoom operation switch 403 has been operated (YES in step S704), the processing proceeds to step S705. In step S705, the drive unit CPU 400 returns the interchangeable lens 2 to the active mode as described above. The basis of the determination in step S704 is not limited to an operation of the zoom operation switch 403. The processing can proceed to step S705 when the user performs any specific operation.

As described above, the drive unit 4 determines the power state of the drive unit 4 considering the power state of the interchangeable lens 2 as well as the power state of the camera body 3. When the camera body 3 is in the power-saving mode, it is generally desirable that the interchangeable lens 2 also enters the power-saving mode, and accordingly, the drive unit 4 enters the power-saving mode to reduce power consumption. When the camera body 3 is in the power-saving mode, the entire imaging system reduces power consumption since the user generally does not intend to take a photograph in such a case.

When the camera body 3 is in the active mode and the interchangeable lens 2 is in the power-saving mode, it is desirable to prevent the drive unit 4 from entering the power-saving mode since the user generally intends to take a photograph in such a case. This enables the entire system, including the interchangeable lens 2, to enter the active mode in response to the user's operation on the zoom operation switch 403 included in the drive unit 4, thus improving the user's convenience. When the camera body 3 is in the active mode, if the drive unit 4 is in the power-saving mode, the interchangeable lens 2 cannot enter the active mode, even when the user operates the zoom operation switch 403. In this case, the user needs to shift the interchangeable lens 2 to the active mode by separately operating the camera body 3. This operation is troublesome for the user.

The above-described exemplary embodiments are to be considered as examples, and can be modified and changed in diverse ways.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-024956, filed Feb. 12, 2016, which is hereby incorporated by reference herein in its entirety.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

What is claimed is:

1. An accessory apparatus attachable to an interchangeable lens attached to a camera body, the accessory apparatus including a power mode settable to a first accessory power mode and a second accessory power mode consuming less power than the first accessory power mode, the camera body including a power mode settable to a first camera power mode and a second camera power mode consuming less power than the first camera power mode, and the interchangeable lens includes a power mode settable to a first lens power mode and a second lens power mode consuming less power than the first lens power mode, the accessory apparatus comprising:

an accessory communication unit configured to communicate with the interchangeable lens; and an accessory control unit configured to control the power mode of the accessory apparatus, wherein, when first information indicating that the power mode of the camera body will shift to the second camera power mode and second information indicating that the power mode of the interchangeable lens will shift to the second lens power mode are received, the accessory control unit sets the power mode of the accessory apparatus to the second accessory power mode.

2. The accessory apparatus according to claim 1,
wherein the interchangeable lens includes a magnification-varying lens,
wherein, in the first accessory power mode, the accessory communication unit communicates at least position information of the magnification-varying lens with the interchangeable lens, and
wherein, in the second accessory power mode, the accessory communication unit does not communicate with the interchangeable lens with respect to at least the position information of the magnification-varying lens.

3. The accessory apparatus according to claim 1,
wherein the interchangeable lens includes a magnification-varying lens, and
wherein, in the first lens power mode, a lens communication unit communicates with the camera body and the accessory apparatus with respect to at least position information of the magnification-varying lens, and
wherein, in the second lens power mode, the lens communication unit does not communicate with the camera body and the accessory apparatus with respect to at least the position information of the magnification-varying lens.

4. The accessory apparatus according to claim 1,
wherein the interchangeable lens includes a magnification-varying lens, and
wherein, in the first camera power mode, a camera communication unit communicates with the interchangeable lens with respect to at least position information of the magnification-varying lens, and
wherein, in the second camera power mode, the camera communication unit does not communicate with the interchangeable lens with respect to at least the position information of the magnification-varying lens.

5. The accessory apparatus according to claim 1, wherein the accessory apparatus includes a power source unit for powering operations of the accessory apparatus.

6. The accessory apparatus according to claim 1,
wherein the camera body includes a camera communication terminal for communicating with the interchangeable lens,
wherein the interchangeable lens includes a first lens communication terminal for communicating with the camera body and a second lens communication terminal for communicating with the accessory apparatus,
wherein the accessory apparatus includes an accessory communication terminal for communicating with the interchangeable lens,
wherein the camera body transmits, via the camera communication terminal, to the interchangeable lens a return command to shift the interchangeable lens from the second lens power mode to the first lens power mode, and
wherein, the accessory apparatus instructs the camera body to transmit the return command to the interchangeable lens by changing a voltage level of the second lens communication terminal in order to change a voltage level of the first lens communication terminal.

7. An accessory apparatus attachable to an interchangeable lens attached to a camera body, the accessory apparatus including a power mode settable to a first accessory power mode and a second accessory power mode consuming less power than the first accessory power mode, the camera body including a power mode settable to a first camera power mode and a second camera power mode consuming less power than the first camera power mode, and the interchangeable lens including a power mode settable to a first lens power mode and a second lens power mode consuming less power than the first lens power mode, the accessory apparatus comprising:
an accessory communication unit configured to communicate with the interchangeable lens; and
an accessory control unit configured to control the power mode of the accessory apparatus,
wherein, when first information indicating that the power mode of the camera body is the second camera power mode and second information indicating that the power mode of the interchangeable lens is the second lens power mode are received, the accessory control unit sets the power mode of the accessory apparatus to the second accessory power mode.

8. An interchangeable lens to which an accessory apparatus is attachable and which is detachably attachable to a camera body, the accessory apparatus including a power mode settable to a first accessory power mode and a second accessory power mode consuming less power than the first accessory power mode and the camera body including a power mode settable to a first camera power mode and a second camera power mode consuming less power than the first camera power mode, the interchangeable lens including:
a controller configured to set a power mode of the interchangeable lens to a first lens power mode and a second lens power mode consuming less power than the first lens power mode;
a first lens communication unit configured to communicate with the camera body; and
a second lens communication unit configured to communicate with the accessory apparatus,
wherein the first lens communication unit receives information indicating that the power mode of the camera body will shift to the second camera power mode, and
wherein the second lens communication unit transmits, to the accessory apparatus, first information indicating that the power mode of the camera body will shift to the second camera power mode and second information indicating that the power mode of the interchangeable lens will shift to the second lens power mode.

9. An interchangeable lens to which an accessory apparatus is attachable and which is detachably attachable to a camera body, the accessory apparatus including a power mode settable to a first accessory power mode and a second accessory power mode consuming less power than the first accessory power mode and the camera body including a power mode settable to a first camera power mode and a second camera power mode consuming less power than the first camera power mode, the interchangeable lens comprising:
a controller configured to set a power mode of the interchangeable lens to a first lens power mode and a second lens power mode consuming less power than the first lens power mode;
a first lens communication unit configured to communicate with the camera body; and a second lens communication unit configured to communicate with the accessory apparatus,
wherein the first lens communication unit receives information indicating that the power mode of the camera body is the second camera power mode, and
wherein the second lens communication unit transmits, to the accessory apparatus, first information indicating that the power mode of the camera body is the second camera power mode and second information indicating that the power mode of the interchangeable lens is the second lens power mode.

10. A camera system comprising:
an interchangeable lens including a power mode settable to a first lens power mode and a second lens power mode consuming less power than the first lens power mode;
an accessory apparatus detachably attachable to the interchangeable lens, the accessory apparatus including a power mode settable to a first accessory power mode and a second accessory power mode consuming less power than the first accessory power mode; and
a camera body, to which the interchangeable lens is detachably attachable, the camera body including a power mode settable to a first camera power mode and a second camera power mode consuming less power than the first camera power mode,
wherein the interchangeable lens includes a first lens communication unit configured to communicate with the camera body and a second lens communication unit configured to communicate with the accessory apparatus,
wherein the camera body includes a camera communication unit configured to communicate with the interchangeable lens,
wherein the first lens communication unit receives information, from the camera communication unit, indicating that the power mode of the camera body will shift to the second camera power mode, and
wherein the second lens communication unit transmits, to the accessory apparatus, first information indicating that the power mode of the camera body will shift to the second camera power mode and second information indicating that the power mode of the interchangeable lens will shift to the second lens power mode.

11. A camera system comprising:
an interchangeable lens including a power mode settable to a first lens power mode and a second lens power mode consuming less power than the first lens power mode;
an accessory apparatus detachably attachable to the interchangeable lens, the accessory apparatus including a power mode settable to a first accessory power mode and a second accessory power mode consuming less power than the first accessory power mode; and
a camera body, to which the interchangeable lens is detachably attachable, the camera body including a power mode settable to a first camera power mode and a second camera power mode consuming less power than the first camera power mode,
wherein the interchangeable lens includes a first lens communication unit configured to communicate with the camera body and a second lens communication unit configured to communicate with the accessory apparatus,
wherein the camera body includes a camera communication unit configured to communicate with the interchangeable lens,
wherein the first lens communication unit receives, from the camera communication unit, information indicating that the power mode of the camera body is the second camera power mode, and
wherein the second lens communication unit transmits, to the accessory apparatus, first information indicating that the power mode of the camera body is the second camera power mode and second information indicating that the power mode of the interchangeable lens is the second lens power mode.

12. A non-transitory storage medium storing a program for executing control of an accessory apparatus detachably attachable to an interchangeable lens attached to a camera body, the accessory apparatus including a power mode settable to a first accessory power mode and a second accessory power mode consuming less power than the first accessory power mode, the program causing a computer to execute:
receiving first information indicating that a power mode of the camera body will shift from a first camera power mode to a second camera power mode consuming less power than the first camera power mode and second information indicating that a power mode of the interchangeable lens will shift from a first lens power mode to a second lens power mode consuming less power than the first lens power mode, the second information being received from the interchangeable lens; and
setting a power mode of the accessory apparatus to the second accessory power mode when the first and the second information are received.

13. A non-transitory storage medium storing a program for executing control of an accessory apparatus detachably attachable to an interchangeable lens attached to a camera body, the accessory apparatus including a power mode settable to a first accessory power mode and a second accessory power mode consuming less power than the first accessory power mode, the program causing a computer to execute:
receiving first information indicating that a power mode of the camera body is a second camera power mode consuming less power than a first camera power mode and second information indicating that a power mode of the interchangeable lens is a second lens power mode consuming lower power than a first lens power mode, the second information being received from the interchangeable lens; and
setting a power mode of the accessory apparatus to the second accessory power mode when the first and the second information are received.

14. A method for controlling an accessory apparatus attachable to an interchangeable lens attached to a camera body, the accessory apparatus including a power mode settable to a first accessory power mode and a second accessory power mode consuming less power than the first accessory power mode, the method comprising:
receiving first information indicating that a power mode of the camera body shifts from a first camera power mode to a second camera power mode consuming less power than the first camera power mode and second information indicating that a power mode of the interchangeable lens will shift from a first lens power mode to a second lens power mode consuming less power than the first lens power mode, the second information being received from the interchangeable lens; and
setting a power mode of the accessory apparatus to the second accessory power mode when the first and the second information are received.

15. A method for controlling an accessory apparatus attachable to an interchangeable lens attached to a camera body, the accessory apparatus including a power mode settable to a first accessory power mode and a second accessory power mode consuming less power than the first accessory power mode, the method comprising:

receiving first information indicating that a power mode of the camera body is a second camera power mode consuming less power than a first camera power mode and second information indicating that a power mode of the interchangeable lens is a second lens power mode consuming lower power than a first lens power mode, the second information being received from the interchangeable lens; and setting a power mode of the accessory apparatus to the second accessory power mode when the first and the second information are received.

* * * * *